United States Patent Office.

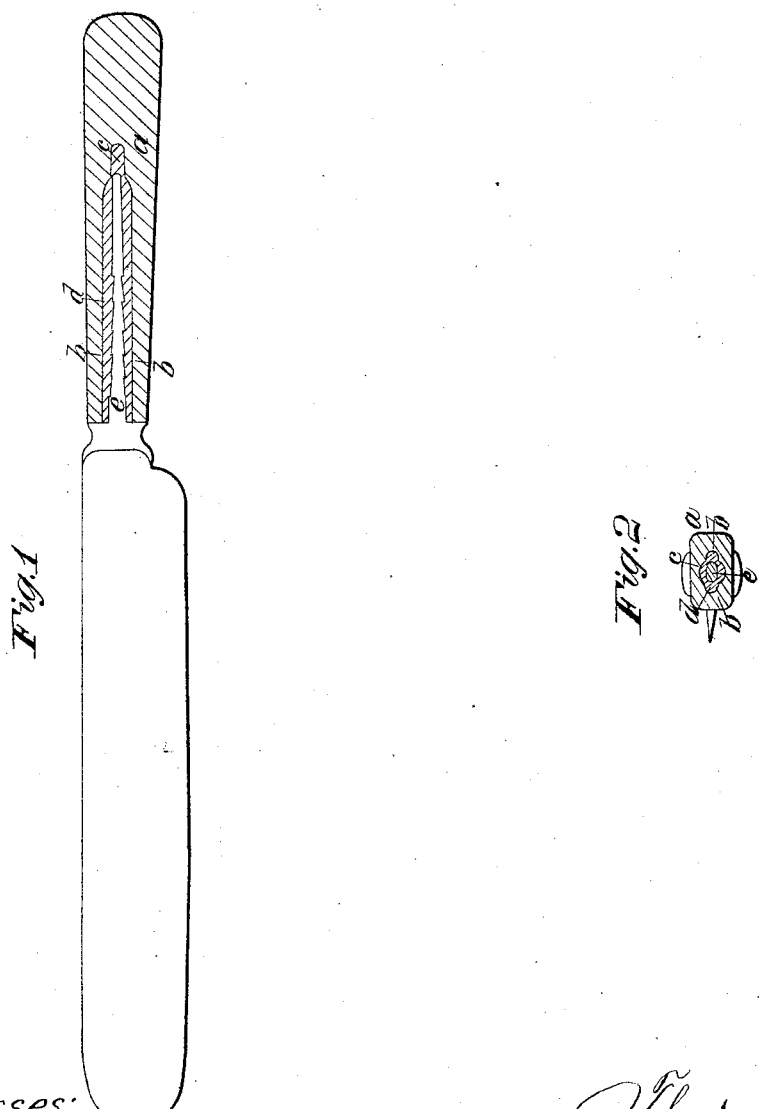

THOMAS McGRAH, OF SHEFFIELD, ENGLAND.

Letters Patent No. 62,661, dated March 5, 1867.

IMPROVEMENT IN CUTLERY.

*The Schedule referred to in these Letters Patent and making part of the same.*

TO ALL WHOM IT MAY CONCERN:

Be it known that I, THOMAS McGRAH, of Sheffield, in the county of York, England, have invented a new and useful Improvement in Securing Handles to Cutlery; and I do hereby declare that the following is a full, clear, and exact description thereof, which will enable others skilled in the art to make and use the same, reference being had to the accompanying drawings, forming a part of this specification, in which—

Figure 1 represents a longitudinal central section of a table-knife and handle, the handle being secured to the blade according to my invention.

Figure 2 is a transverse section of the handle and tang.

Similar letters of reference indicate like parts.

This invention consists in more effectually securing the handles of cutlery, especially table cutlery, to the tangs of the blades, forks, etc., so as to prevent the possibility of the handles becoming loose when placed in hot water. Hitherto rosin, mixed with ingredients to stiffen or increase its density, has been employed, but the readiness with which rosin dissolves in hot water renders it useless as a permanent fastening; and, as table cutlery is generally cleaned in hot or warm water, the rosin softens or melts and expands or swells, and frequently forces out the tang of the blade or fork, and also forces itself out of the handle, leaving a cavity, so that although the tang and handle may be pivoted or riveted together, and the tang and handle not absolutely detached, yet they will be loose and useless. Various expedients have been resorted to to remedy this difficulty, such as riveting, the extending of the tang entirely through the handle, and securing it at the outer end of the same, all of which have augmented the cost of manufacture, while they have been attended with only partial success.

My invention consists in substituting sulphur, (either alone or mixed with other ingredients, in lieu of rosin, pitch, or other substances hitherto used for the purpose,) hot water having but little or no appreciable effect upon sulphur.

The following process I prefer, but do not limit myself to it: The handles $a$ of the cutlery are bored in the usual way to receive the tangs, and by means of a graver or other proper tool I cut a groove or cavity, $b$, in opposite sides of the bore $c$, longitudinally therewith, and extending within the handle about half of the length of the bore. I then pour liquid sulphur, $d$, into the bore, the sulphur having been fused in a pan or ladle of considerable thickness, so as to retain the heat as long as possible. The sulphur may be thickened with whiting, ground flint, or other substance, to give it consistency. I then insert the tang $e$ of the blade or fork, which may be indented or corrugated in any proper manner and properly heated, into the handle, and the sulphur, when set firmly, secures the handle and tang together.

This invention, it will be seen, only applied to such cutlery which is provided with round or "whittle" tangs.

Having thus described my invention, I claim as new, and desire to secure by Letters Patent—

The securing of handles to the tangs of cutlery by means of sulphur, substantially as set forth.

The above specification of my invention signed by me this 20th day of January, 1866.

THOMAS McGRAH.

Witnesses:
   JAMES D. FRANCE,
   GEORGE S. WATSON.